United States Patent
Bartomeli et al.

(10) Patent No.: US 8,930,831 B2
(45) Date of Patent: Jan. 6, 2015

(54) USER INTERFACE GENERATION BASED ON BUSINESS PROCESS DEFINITION

(75) Inventors: Nick Bartomeli, Shelton, CT (US); John Hack, Maplewood, NJ (US); Gregory Laguarigue, Paris (FR)

(73) Assignee: SAP SE, Waldorff (DE)

( * ) Notice: Subject to any disclaimer, the term of this patent is extended or adjusted under 35 U.S.C. 154(b) by 319 days.

(21) Appl. No.: 12/981,861

(22) Filed: Dec. 30, 2010

(65) Prior Publication Data

US 2012/0173996 A1    Jul. 5, 2012

(51) Int. Cl.
G06F 3/14    (2006.01)
G06F 9/44    (2006.01)

(52) U.S. Cl.
CPC .................. G06F 9/4443 (2013.01)
USPC ............ 715/762; 715/513; 715/700; 709/224

(58) Field of Classification Search
CPC ..................... G06F 3/14; G06F 3/17
USPC .......... 715/200–277, 700–867; 700/701–866; 709/201–229; 705/50–79; 345/30–111
See application file for complete search history.

(56) References Cited

U.S. PATENT DOCUMENTS 5,870,559 A * 2/1999 Leshem et al. ................. 709/224
2005/0050452 A1 * 3/2005 Weitzel et al. ................. 715/513

OTHER PUBLICATIONS

Sebastian Feuerstack et al., "Prototyping of Multimodal Interactions for Smart Environments based on Task Models", taken from Constructing Ambient Intelligence, Communications in Computer and Information Science, 2008, vol. 11, Part 3, DOI: 10.1007/978-3-540-85379-4_17, (pp. 139-146, total 8 pages).

Anind K. Dey et al., "CyberDesk: A Framework for Providing Self-Integrating Ubiquitous Software Services", 1997, URI: http://hdl.handle.net/1853/3530, 10pgs.

* cited by examiner

*Primary Examiner* — Ruay Ho

(74) *Attorney, Agent, or Firm* — Buckley, Maschoff & Talwalkar LLC

(57) ABSTRACT

A system and method including retrieval of a markup language file, the markup language file defining a business process including a plurality of steps, each of the plurality of steps being associated with a plurality of actions; and automatic generation of code executable based on the markup language file to present a first user interface associated with a first one of the plurality of steps of the business process, the first user interface comprising a first plurality of user interface controls, where each user interface of the first set of user interface controls corresponds to one of a plurality of a actions that are associated with the first one of the plurality of steps and is selectable to execute the corresponding one of a plurality of actions.

15 Claims, 10 Drawing Sheets

```xml
<?xml version="1.0" encoding="utf-8"?>
<BPFDataSet>
  <BPF>
    <BPFID>BPF unique ID</BPFID>
    <BPFName>BPF name</BPFName>
    <BPFDesc>BPF description</BPFDesc>
    <AppName> Application name to control </AppName>
    <IsReviewer> whether user is a reviewer or not
        ("0":False or "1":True)</IsReviewer>
  </BPF>
  <BPFStep>
    <BPFID> BPF unique ID </BPFID>
    <StepID> Step unique ID </StepID>
    <StepName>Step name</StepName>
    <StepDesc>Step description </StepDesc>
    <ParentStepID>Step id of parent step</ParentStepID>
    <StepType>Step type(0: Main step, 1:Sub step)</StepType>
    <StepOrder>Sequence of step (Integer)</StepOrder>
    <StepComplete>Complete flag of main-step (0: False, 1:True)</StepComplete>
    <SubStepComplete> Complete flag of sub-step (0: False, 1:True)</SubStepComplete>
    <EnableReviewers>Flag for review (0:not required, 1:required)</EnableReviewers>
    <EnableAlerts> Flag for alert (0:not required, 1:required)</EnableAlerts>
    <RequiresManagerReview>not used field</RequiresManagerReview>
    <EnableCompletionCriteria> Flag for completion criteria
        (0:not required, 1:required)</EnableCompletionCriteria>
    <WorkStatus>WorkStatus ID for completion</WorkStatus>
    <AlertStatus>Status of alert (not used field)</AlertStatus>
    <ValidateStatus>Validated whether or not  (0: False, 1:True)</ValidateStatus>
    <ReviewStatus> Reviewed whether or not  (0: False, 1:True)</ReviewStatus>
    <ManagerReviewStatus> not used field</ManagerReviewStatus>
  </BPFStep>
  <BPFAction>
    <StepID>Step ID</StepID>
    <ActionID>Action unique ID</ActionID>
    <ActionName>Action name</ActionName>
    <ActionOrder>Sequence of action</ActionOrder>
    <ActionGroupID>Module UI Group code (Ex. G02)</ActionGroupID>
    <ActionModuleName>Action module name for action  (Ex."MNU_eANALYZE
        _OPENSTANDARD")</ActionModuleName>
    <CVFlag>Flag whether Current View is required or not
        (0:not required, 1:required)</CVFlag>
  </BPFAction>
  <BPFActionParam>
    <StepID>Step ID</StepID>
    <ActionID>Action ID</ActionID>
    <ParamValue>Value of action parameter (Ex. "Wizard\template3.xlt")
        </ParamValue>
    <ParamOrder>Sequence of action parameter</ParamOrder>
    <ParamName>Type of parameter (Ex. "File")</ParamName>
  </BPFActionParam>
  <BPFActionCV>
    <StepID>Step ID</StepID>
    <ActionID>Action ID</ActionID>
    <AppName>Application Name</AppName>
    <DimName>Dimension of CurrentView</DimName>
    <CVType>CurrentView Type(1: Member lookup, 2: Inherit from CV,
        3: Inherit form data region")</CVType>
    <MemberName>Member Name</MemberName>
  </BPFActionCV>
</BPFDataSet>
```

*FIG. 3*

USER INTERFACE GENERATION BASED ON BUSINESS PROCESS DEFINITION

BACKGROUND

Conventional business software applications are developed for execution within a business application platform. These applications are typically intended to assist business users in the execution of business processes. A business application platform typically supports a user interface layer to facilitate user interaction with the business applications. More specifically, user interfaces are developed for a business application and a target client device, and are provided to client devices by the user interface layer.

Customized user interfaces may be developed for each business application and/or target client device. Alternatively, generic user interfaces may be developed to provide interaction with several business applications and/or target client devices. A developer of such a business application must ensure compatibility of the business application with the generic user interfaces.

Systems are desired for efficiently generating user interfaces based on a defined business process.

BRIEF DESCRIPTION OF THE DRAWINGS

FIG. 3 illustrates a portion of a markup language file defining a business process according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
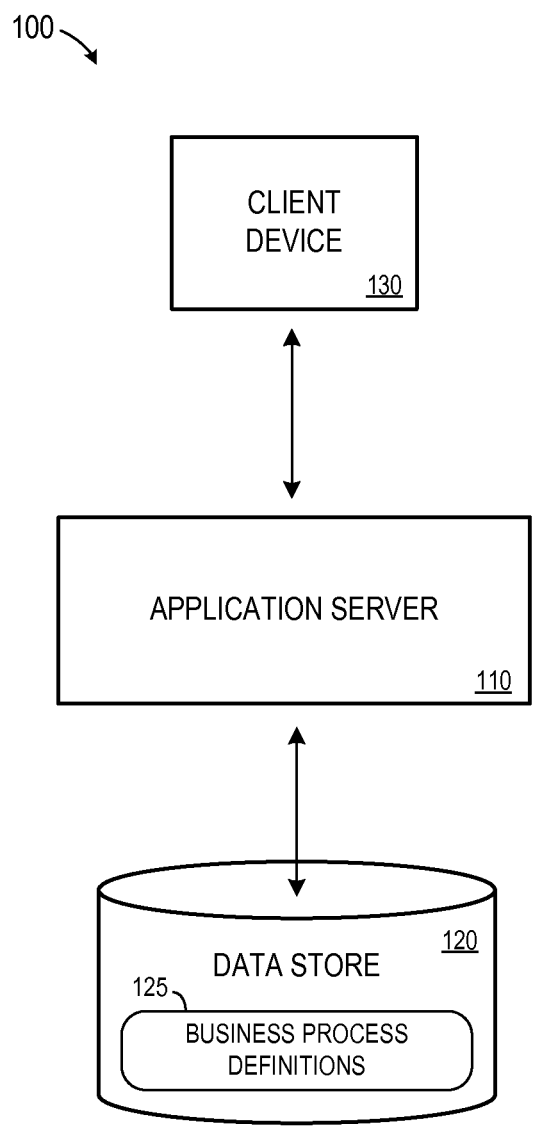
FIG. 1 is a block diagram of a system according to some embodiments.

FIG. 1 is a block diagram of system 100 according to some embodiments. FIG. 1 represents a logical architecture for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Application server 110 may provide functionality based on data of data store 120. Application server 110 may also provide business context and logic to assist with the interpretation of the data. In this regard, according to some embodiments, application server 110 may encapsulate the data into business objects including both data and related logic.

Application server 110 may provide business processes to authorized clients as is known in the art. A business process may comprise software functionality for a target business segment. A business process may include, but is not limited to, functionality related to schedules, reports, ETL processes, management approvals, standard business practices (e.g., revenue forecasts by product line, costs by department), and security. Business processes may guide and coordinate end-users toward a common performance management goal such as creating a compliant forecast or statutory-consolidated financial results. One or more business processes may be implemented as a Web Service and exposed via Web Services of application server 110. Embodiments may comprise any types of business processes, Web Services, and software-provided functions that are or becomes known.

Data store 120 may comprise a physical or an in-memory (e.g., in Random Access Memory) database. The data of data store 120 may be received from disparate hardware and software systems, some of which are not interoperational with one another. The systems may comprise a back-end data environment employed in a business or industrial context. The data may be pushed to data store 120 and/or provided in response to queries received therefrom.

Data store 120 may comprise a relational database, a multi-dimensional database, an eXtendable Markup Language (XML) document, or any other structured data storage system. The physical tables of data store 120 may be distributed among several relational databases, dimensional databases, and/or other data sources. To provide economies of scale, data store 120 may include data of more than one customer. In such an implementation, application server 110 includes mechanisms to ensure that a client accesses only the data that the client is authorized to access. Moreover, the data of data store 120 may be indexed and/or selectively replicated in an index to allow fast retrieval thereof.

Application server 110 may provide for the execution of business processes based on business process definitions 125. Business process definitions 125 may define any business processes including, but not limited to, those described above. Examples of business process definitions according to some embodiments are set forth in co-pending U.S. application Ser. No. 12/241,886, filed Sep. 30, 2008 and incorporated herein by reference for all purposes.

Generally, business process definitions 125 comprise markup language files defining respective business processes. For example, one or more of business process definitions 125 may specify metadata and a structure of a business process. In some embodiments, a business process definition 125 may describe a business process in a platform-independent manner to facilitate implementation of the process within heterogeneous computing platforms.

According to some embodiments, application server 110 automatically generates a user interface based on a business process definition 125. Examples of this operation according to some embodiments will be described in detail below. More generally, the generated user interface may be described as code which is executable to present a user interface associated with the business process. In this regard, the generated user interface may comprise HyperText Markup Language (HTML) files, JavaScript, Visual Basic, and/or any other type of code which may be executed/rendered to present a user interface.

Client device 130 may present user interfaces to allow interaction with business applications executed by application server 110. Presentation of a user interface may comprise any degree or type of rendering, depending on the type of user interface code generated by server 110. For example, client device 130 may execute a Web Browser to receive a Web page (e.g., in HTML format) from application server 110, and may render and present the Web page according to known protocols. Client device 130 may also or alternatively present user interfaces by executing a standalone executable file (e.g., an .exe file) or code (e.g., a JAVA applet) within by a virtual machine.

Figure 2:
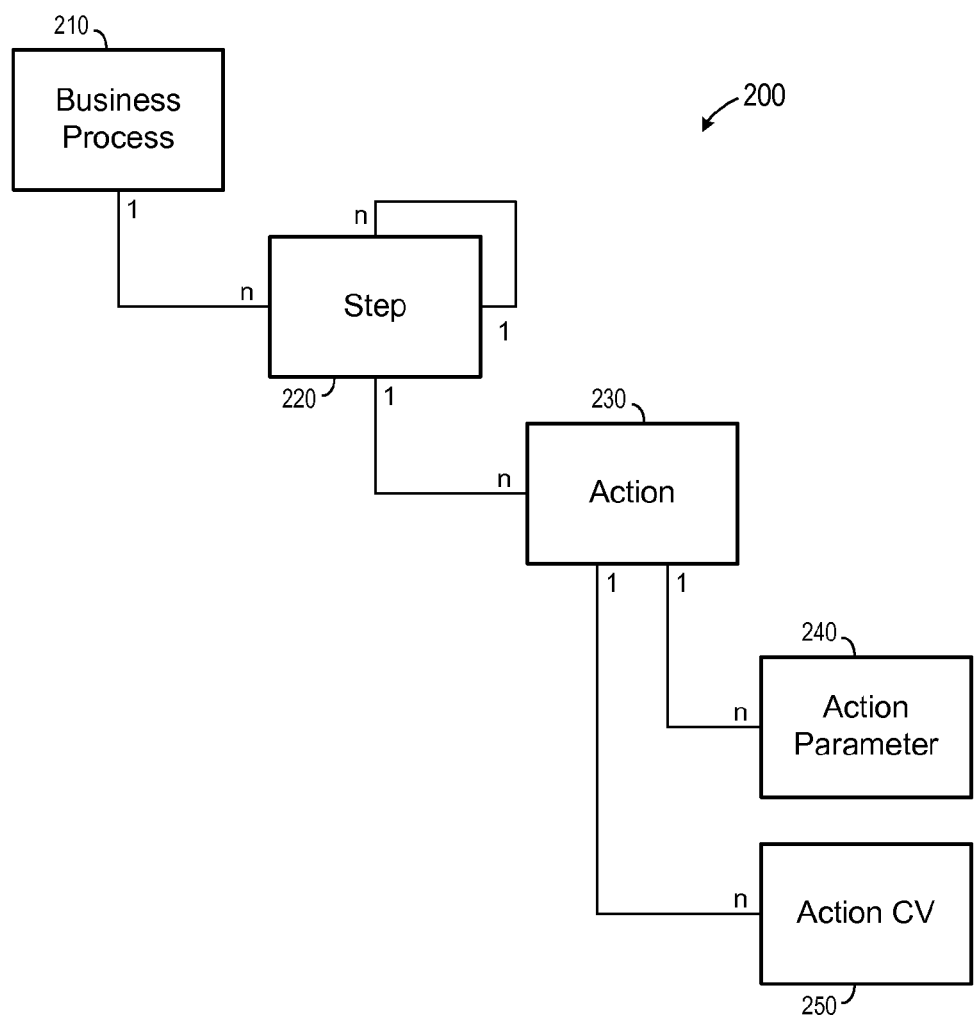
FIG. 2 is a diagram of a business process model according to some embodiments.

FIG. 2 is a diagram of business process model 200 according to some embodiments. Model 200 includes entities which may be used by business process definitions 125 to define respective business processes. Embodiments are not limited to model 200.

Business process entity 210 defines a business process and may include a name, description, unique identifier and a controlling application (e.g., an Online Analytical Processing (OLAP) cube). Step entity 220 exhibits a many-to-one (n:1) relationship with business process entity 210 (i.e., a business process may include any number of steps) and instances thereof may include descriptive information about a step, controlling information regarding completeness of the step, and options for validation, alerts, etc. Step entity 220 includes a self-reference, which allows for the definition of sub-steps (i.e., steps which define a part of a "parent" step).

Each instance of step entity 220 may be associated with zero or more instances of action parameter entity 240 and/or zero or more instances of action current view entity 250. Instances of action parameter entity 240 define parameters which may differ according to action type and/or the step associated with the action. For example, an action parameter may comprise one or more objects such as report templates, Extract, Transform and Load (ETL) processes, Uniform Resource Locators, or the like. In some embodiments where the report templates are Microsoft Office 2007 documents, the report templates may be formatted according to an open eXtensible Markup language (XML) format for defining spreadsheets. ETL processes may be similarly formatted, particularly if the environment of application server 110 is Microsoft SQL 2005.

Instances of action current view entity 250 generally describe a "slice" of data which is relevant to the associated instance of action entity 230. The description may include one or more OLAP dimensions, locking information indicating resources (e.g., records) which are protected from concurrent transactions, fixed member information, or the like. Non-OLAP-based definitions of data may also or alternatively be employed.

FIG. 3 shows portion 300 of a markup language file defining a business process according to some embodiments. The markup language file may be stored among business process definitions 125 of data store 120.

Portion 300 conforms to model 200 of FIG. 2. More specifically, portion 300 includes a business process entity denoted by tag <BPF>, a step entity denoted by tag <BPFStep>, an action entity denoted by tag <BPFAction>, an action parameter entity denoted by tag <BPFActionParam>, and an action current view entity denoted by tag <BPFActionCV>. As described above, any number of instances of these entities may exist in any combination for a given business process entity. Embodiments are not limited to the markup language, the tags or the structure of portion 300.

Figure 4:
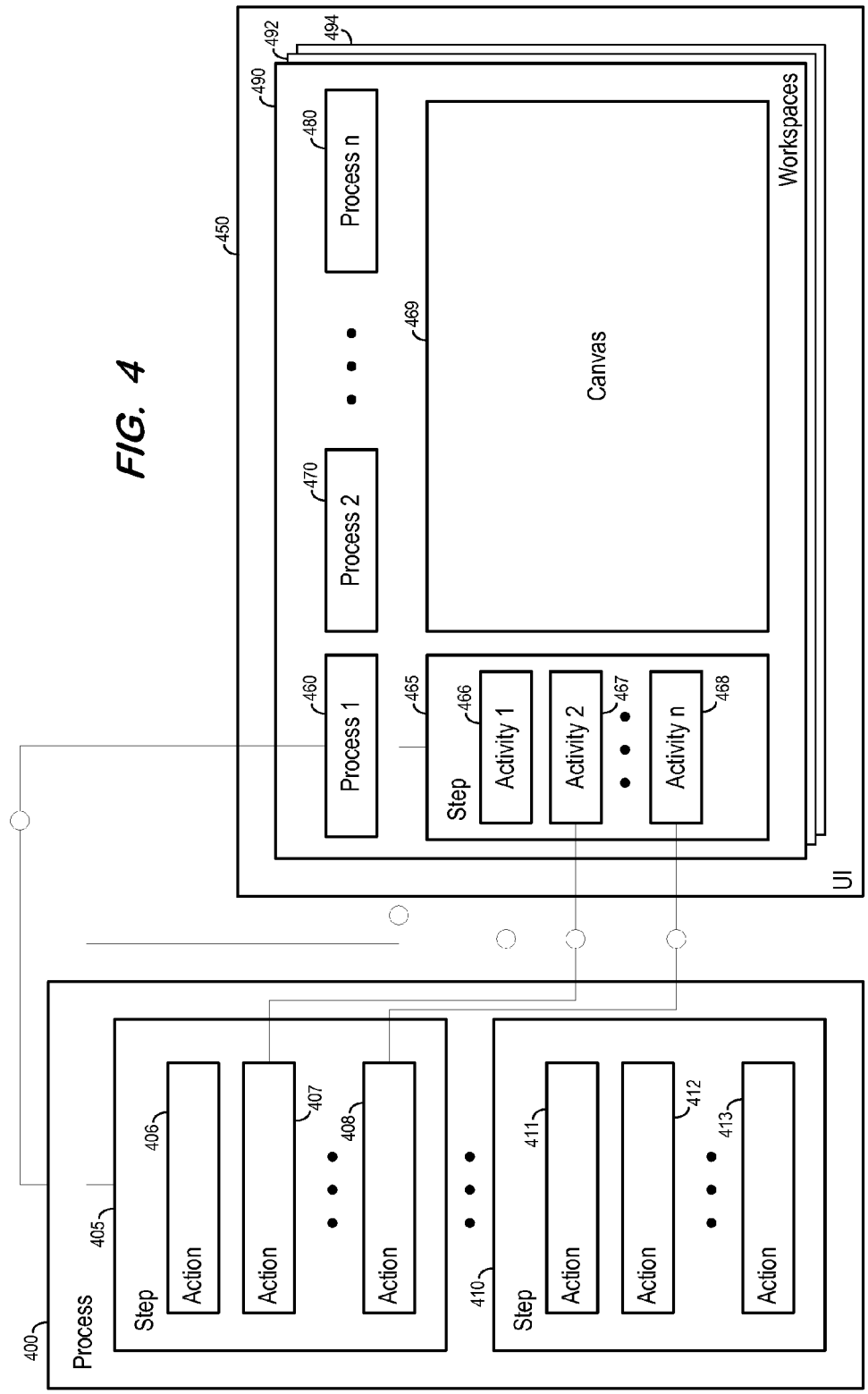
FIG. 4 is a block diagram illustrating a mapping between a defined business process and user interface elements according to some embodiments.

As described above, some embodiments provide automatic generation of a user interface based on a business process definition. FIG. 4 illustrates a mapping between a business process definition and elements of a user interface according to some embodiments.

It will be assumed business process 400 is defined by a markup language file and includes steps 405 and 410. Step 405, in turn, includes actions 406 through 408, and step 410 includes actions 411 through 413. User interface 450 corresponds to business process 400 according to some embodiments. That is, embodiments may generate, based on business process 400, code that is executable to present user interface 450.

User interface 450 includes UI control 460 corresponding to business process 400. In some embodiments, UI control 460 is selectable to present UI element 465 associated with step 405. UI element 465 includes UI controls 466 through 468, each of which corresponds to a respective one of actions 406 through 408. In some embodiments, selection of one of UI controls 466 through 468 causes user interface 450 to present a graphical area for performance of the respective action. The graphical area may be presented within canvas 469. Embodiments are not limited to the mapping and operation described with respect to FIG. 4.

In accordance with some embodiments, UI elements 460 through 469 are components of workspace 490. Workspace 490 may be suited to a particular user role, but embodiments are not limited thereto. In this regard, workspace 490 also includes UI controls 470 and 480 corresponding to business processes other than business process 400. These other business processes may be defined by business process definitions of a markup language file. UI controls 470 and 480 may be selected to present corresponding user interfaces generated based on their respective business process definitions. Workspaces 492 and 494 may be suited to different user roles, and may also provide user interfaces which are generated based on business process definitions as described herein.

Figure 5:
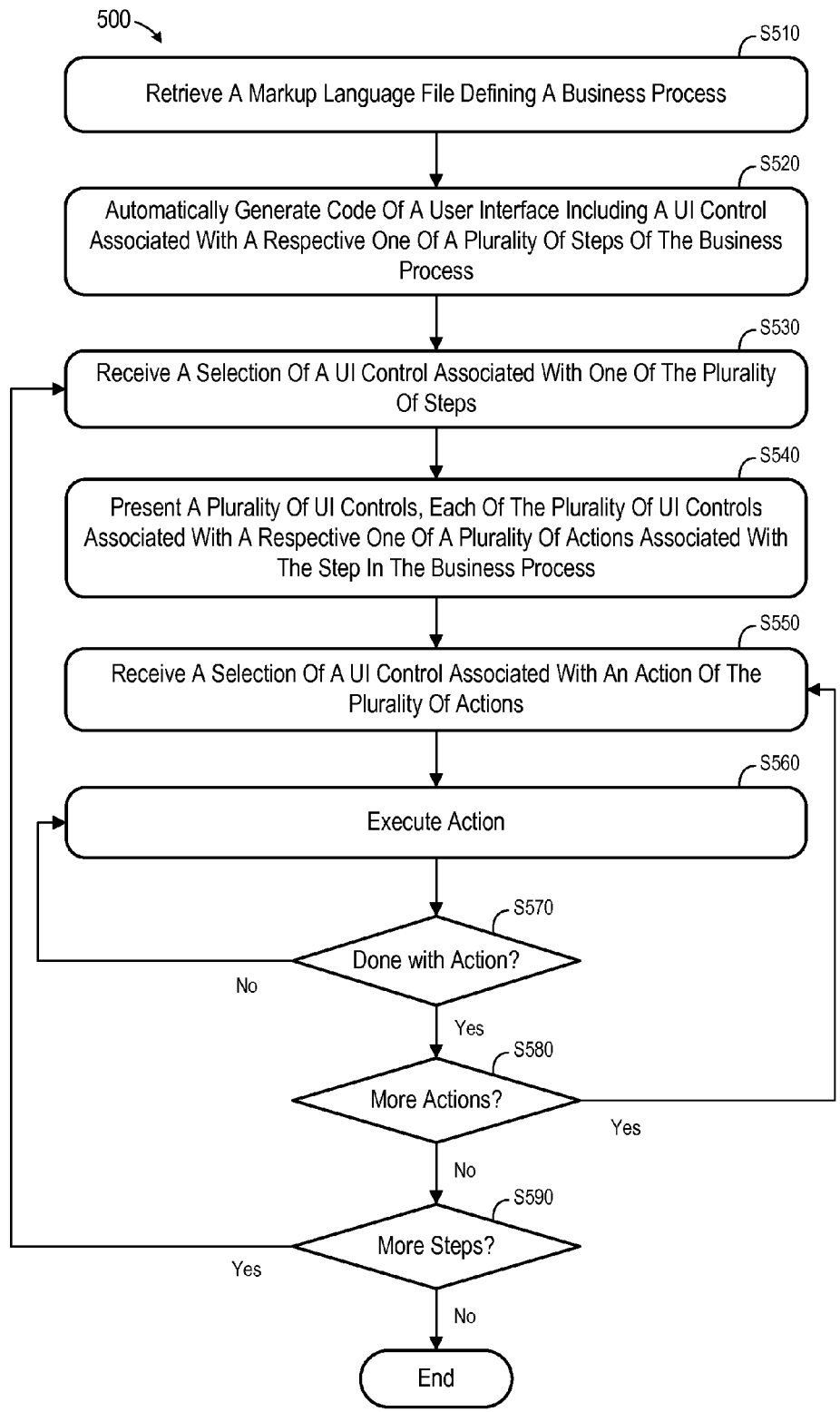
FIG. 5 is a flow diagram of a process according to some embodiments.

FIG. 5 is a flow diagram of process 500 according to some embodiments. Process 500 may be executed by hardware and embodied in program code stored on a tangible medium. System 100 may execute process 500, but embodiments are not limited thereto.

Initially, a markup language file defining a business process is retrieved at S510. In one example, a user operates client device 130 to access a user portal of application server 110 prior to process 500. As described above, such access may comprise receipt of a Web page and/or JavaScript at a Web browser of client device.

Figure 6:
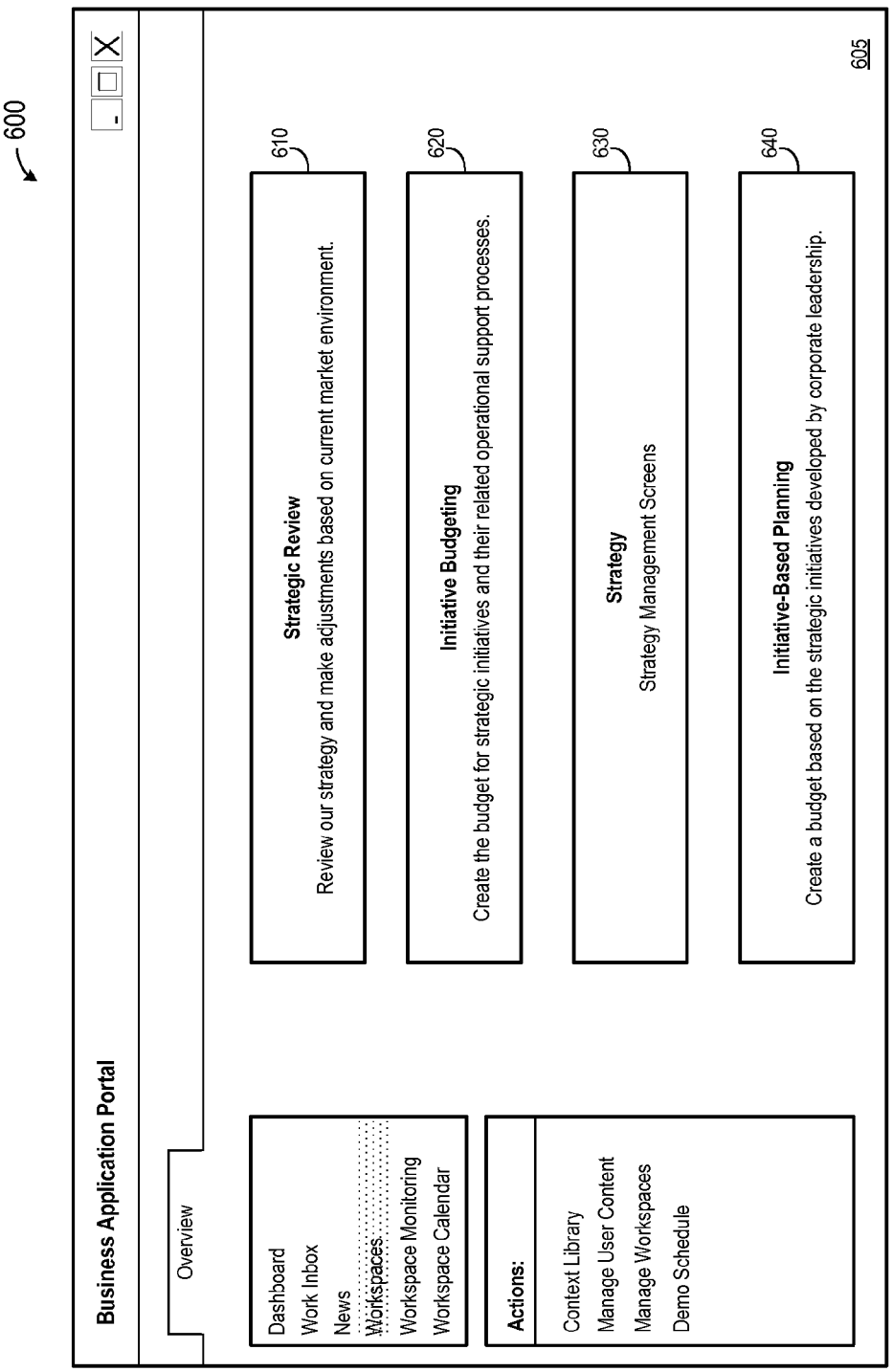
FIG. 6 is an outward view of a user interface according to some embodiments.

Window 600 of FIG. 6 presents an example of portal home page 605 according to some embodiments, in which the link "Workspaces" has been selected. In order to generate the code of page 600 (e.g., HTML, JavaScript, Visual Basic), application server 110 retrieves business process definitions of definitions 125 which correspond to the user's role at S510. A UI object, referred to herein as a workspace, is created for each retrieved business process definition. As shown, page 605 presents selectable areas 610 through 640, each of which corresponds to a respective workspace. For purposes of the present example, it will be assumed that area 610 is then selected.

Figure 7:
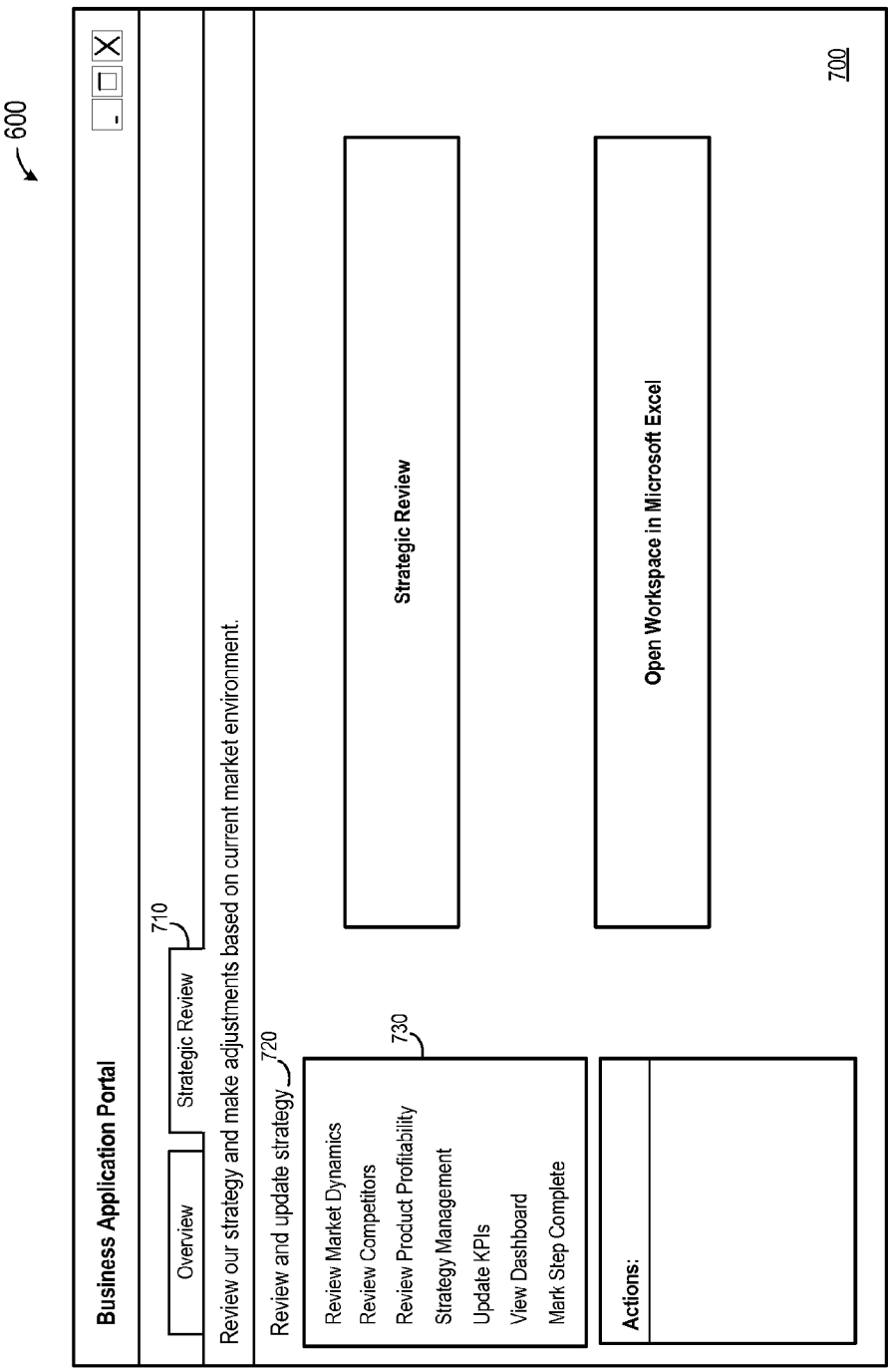
FIG. 7 is an outward view of a user interface according to some embodiments.

In response to the selection, application server 110 automatically generates code of a user interface at S520. The user interface includes a UI control associated with a respective one of a plurality of steps of the business process. FIG. 7 shows user interface 700, which is automatically generated at S520 according to some embodiments.

The term "user interface", as used herein, may describe one or more graphical areas including any number of UI controls which may receive user input (e.g., via a mouse-click). The one or more graphical areas may also include other UI elements (e.g., work areas, reports, graphics, etc.) to facilitate interaction with a user. Moreover, the one or more graphical areas of a user interface need not be presented simultaneously. For example, FIGS. 7 through 9 include different UI controls and UI elements but are considered to illustrate single user interface 700 according to some embodiments.

With respect to FIG. 7, Interface 700 is presented as a "tabbed" page, with the name of the selected workspace (i.e., business process) presented in tab 710. Text 720 identifies a step of the business process, while UI controls (e.g., hyperlinks) 730 are associated with sub-steps of step 720. One of the UI controls 730 is selected at S530.

Figure 8:
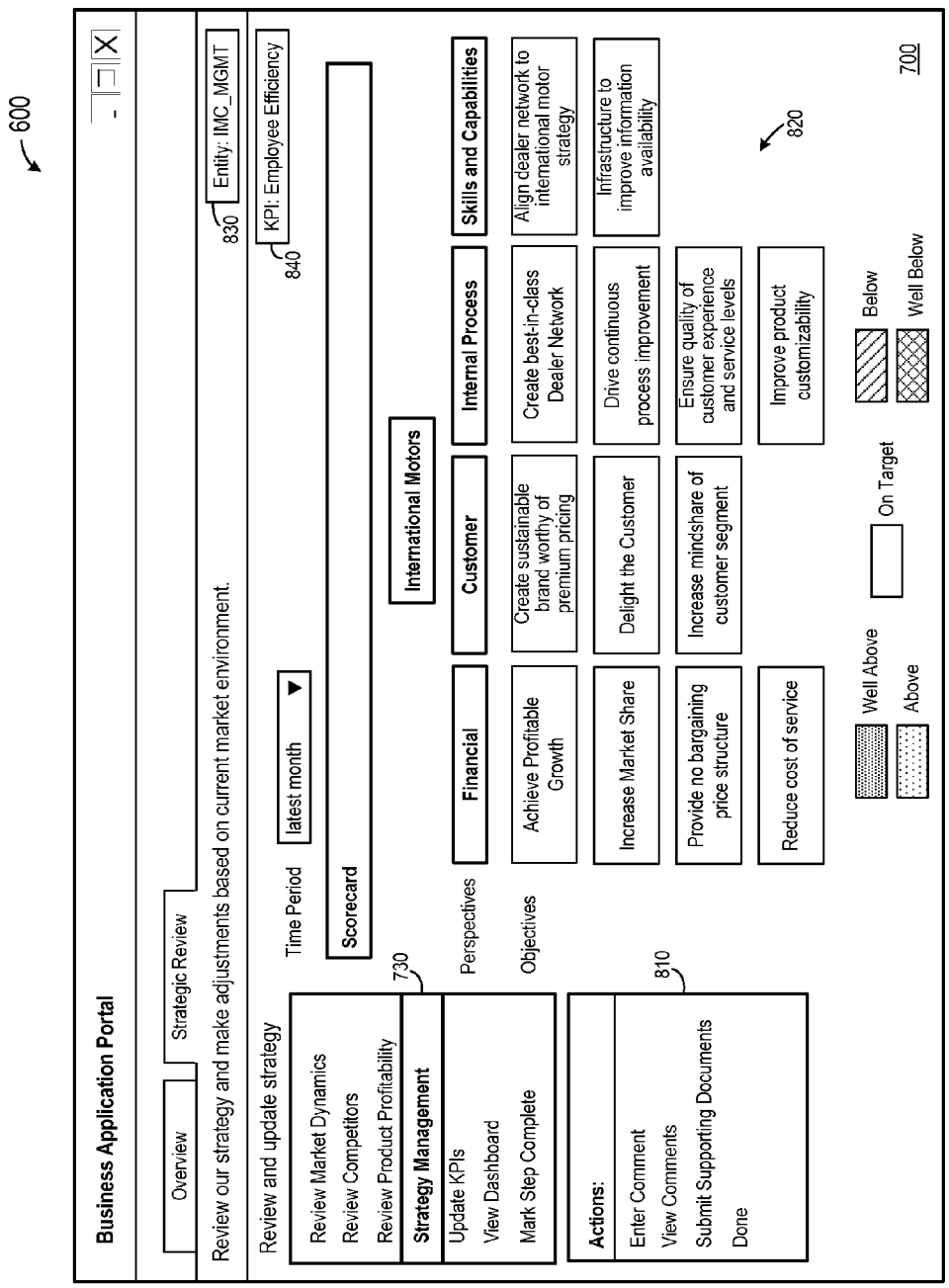
FIG. 8 is an outward view of a user interface according to some embodiments.

In response to the selection, a plurality of UI controls is presented at S540. Each of the presented plurality of UI controls is associated with a respective one of a plurality of actions of the step selected at S530. Continuing with the present example, FIG. 8 illustrates user interface 700 after selection of Strategy Management UI control 730 at S530. As a result, FIG. 8 shows UI controls 810, each of which corresponds to a respective action associated with the selected step.

According to some embodiments, a default action associated with the selected step (as specified by the business process definition) is invoked and the resulting output is rendered in graphical area 820. Moreover, a user selection of one of UI controls 810 may be received at S550. The action associated with the selected UI control is executed at S560. For example, if the user selects the Enter Comment UI control 810, a separate comment input dialog may be presented in graphical area 820.

Each step, sub-step and action of the business process may be associated with respective and different constraints regarding the data range under which it operates. This data range is referred to above as the current view. As the user navigates the workspace by manipulating the presented UI controls, the current view is updated as specified by the business process definition. Identifiers 830 and 840 provide information regarding the current view of the currently-displayed business process elements.

Execution of an action at S560 may include launching of other applications. For example, window 600 may be a Web browser window but execution of an action may require launching a separate spreadsheet application. Execution of the action continues until the action is determined to be complete at S570. If the user desires to perform additional actions associated with the current step (i.e., sub-step), flow returns to S550 to receive a selection of a next UI control associated with an action.

Figure 9:
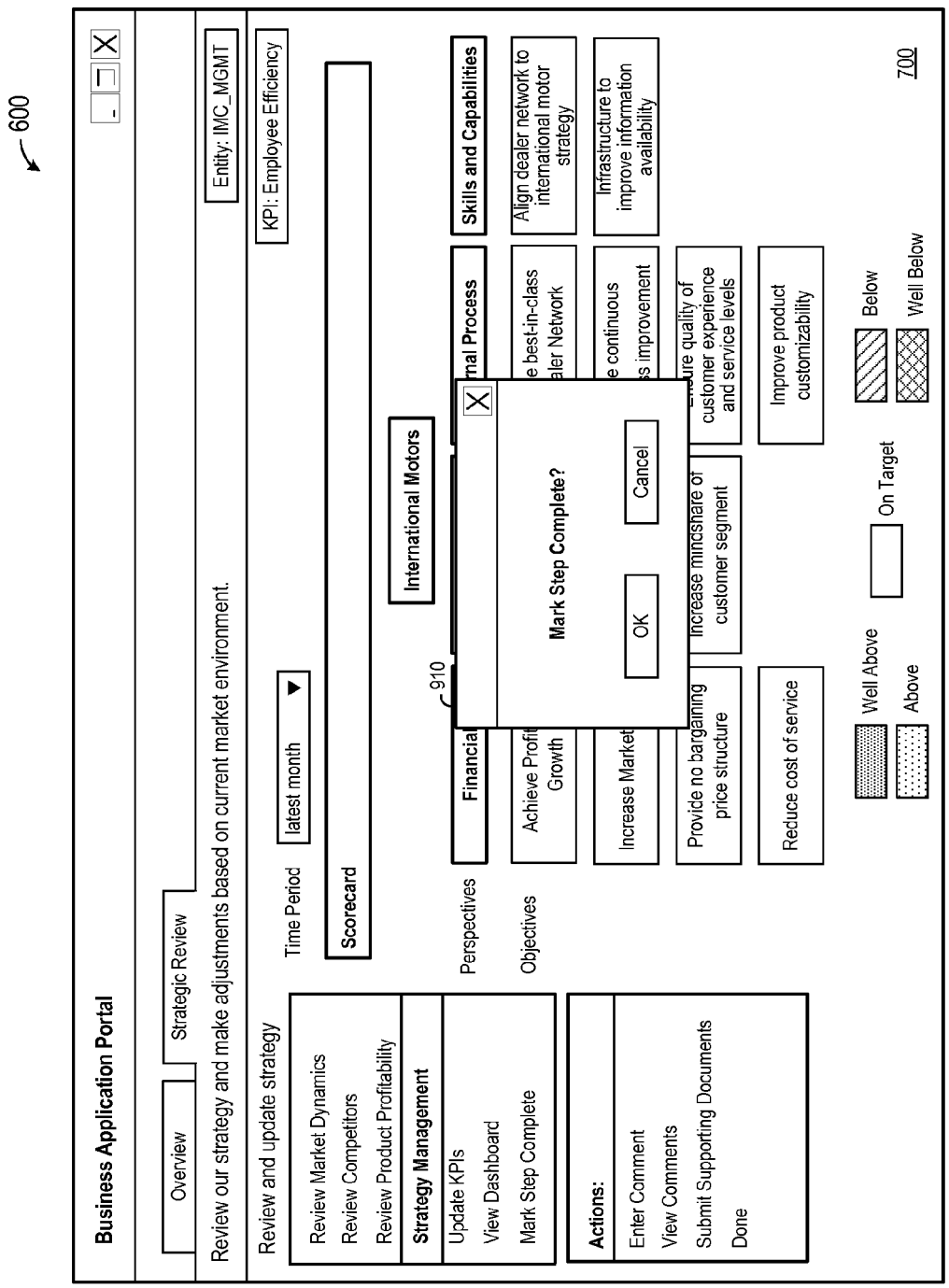
FIG. 9 is an outward view of a user interface according to some embodiments.

UI controls 810 may include a Done UI control according to some embodiments. The Done UI control might not correspond to any action defined in the business process, but may be included to facilitate transitioning to a next step of the business process. Similarly, UI controls 730 include a Mark Step Complete UI control which does not correspond to any step defined in the business process. FIG. 9 illustrates dialog 910 which may be presented upon selection of Done UI control 810 or Mark Step Complete UI control 730 at S580.

The user may continue to execute additional actions, in which case flow returns to S550 from S580. Additionally, flow returns to S530 from S590 if the user desires to select additional steps. According to some embodiments, if the user chooses to close the workspace (e.g., to halt work for a period of time, because the business process defines a required approval stage) then page 605 is again presented, or the tab containing the workspace is closed. Upon re-selection of the business process, a user interface is again generated including UI controls associated with the next step to be performed in the business process.

Figure 10:
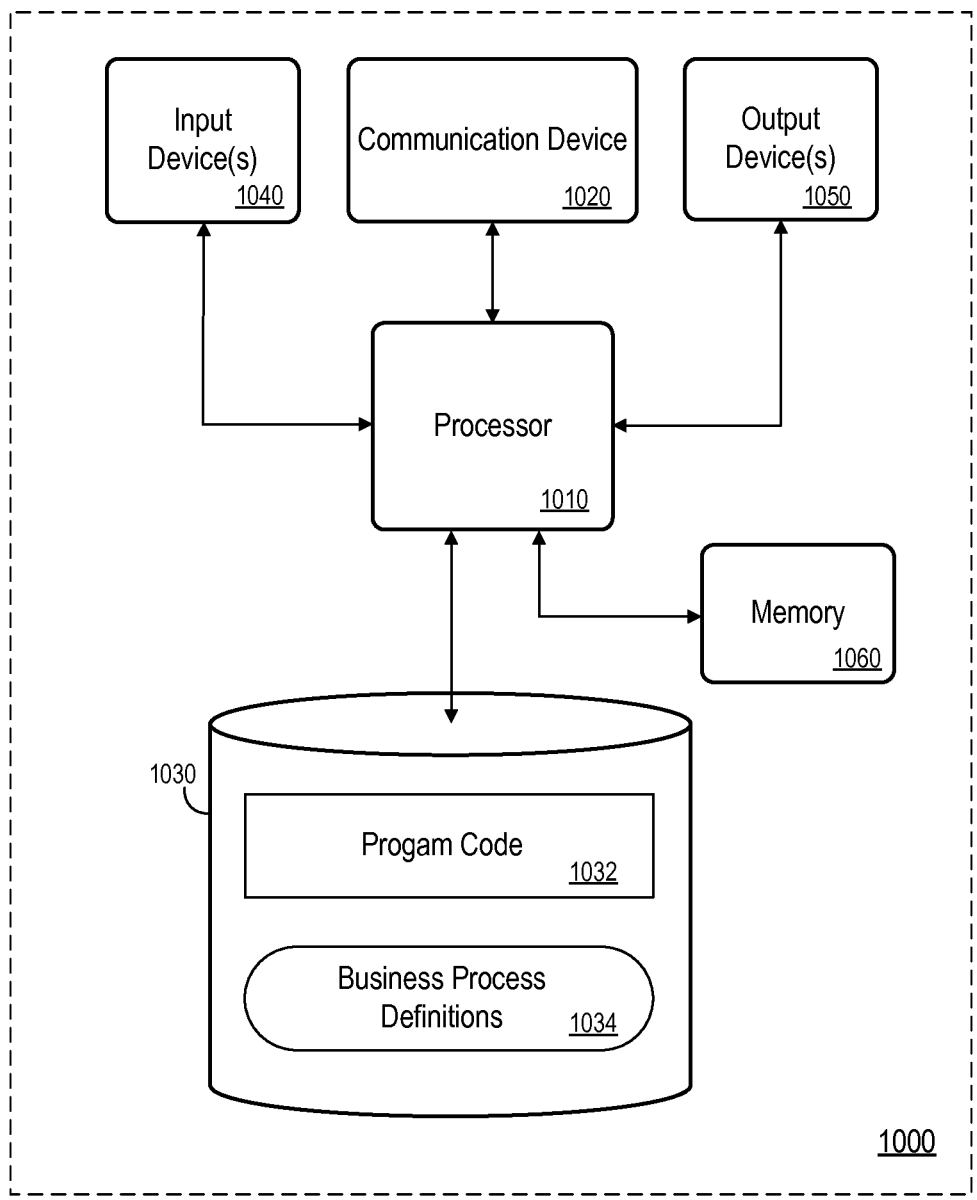
FIG. 10 is a block diagram of a computing device according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of one or more elements of system 100. Apparatus 1000 may include other unshown elements according to some embodiments.

Apparatus 1000 includes processor 1010 operatively coupled to communication device 1020, data storage device 1030, one or more input devices 1040, one or more output devices 1050 and memory 1060. Communication device 1020 may facilitate communication with external devices, such as a client device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

Program code 1032 of data storage device 1030 may be executable by processor 1010 to provide any of the processes described herein. Embodiments are not limited to execution of these processes by a single apparatus. Business process definitions 1034 may comprise markup language files based on which user interfaces may be automatically generated as described herein. Data storage device 1030 may also store data and other program code for providing additional functionality and/or which are necessary for operation thereof, such as device drivers, operating system files, etc.

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, comprising:

retrieving a business process definition, the business process definition comprising a markup language file defining and including functionality related to a processor-executable business process that includes a plurality of steps, each of the plurality of steps of the processor-executable business process being associated with a plurality of actions; and automatically generating, by the processor and based on the business process definition, a first user interface associated with a first one of the plurality of steps of the processor-executable business process, the first user interface being embodied as code executable to present the first user interface, the first user interface comprising a first set of user interface controls, wherein each user interface control in the first set of user interface controls corresponds to one of a plurality of actions that are associated with the first one of the plurality of steps and is selectable to execute the corresponding one of the plurality of actions.

2. A method according to claim 1, further comprising:
automatically generating, by the processor and based on the business process definition, a second user interface associated with a second one of the plurality of steps of the processor-executable business process, the second user interface being embodied as code executable to present the second user interface, the second user interface comprising a second set of user interface controls, wherein each user interface control in the second set of user interface controls corresponds to one of a plurality of actions that are associated with the second one of the plurality of steps and is selectable to execute the corresponding one of the plurality of actions associated with the second one of the plurality of steps; and automatically generating, by the processor and based on the business process definition, a third user interface, the third user interface being embodied as code executable to present the third user interface and comprising the first user interface and the second user interface.

3. A method according to claim 2, further comprising:
presenting the first user interface and the second user interface in a same workspace.

4. A method according to claim 1, further comprising:
transmitting the automatically generated code to a client device.

5. A method according to claim 1, wherein the first user interface comprises an area including at least one user interface element to execute the one of the plurality of actions.

6. A non-transitory medium storing processor-executable program code thereon, the medium comprising:
program code to retrieve a business process definition, the business process definition comprising a markup language file defining and including functionality related to a processor-executable business process that includes a plurality of steps, each of the plurality of steps of the processor-executable business process being associated with a plurality of actions; and program code to automatically generate, based on the business process definition, a first user interface associated with a first one of the plurality of steps of the processor-executable business process, the first user interface being embodied as code executable to present the first user interface, the first user interface comprising a first set of user interface controls, wherein each user interface control in the first set of user interface controls corresponds to one of a plurality of actions that are associated with the first one of the plurality of steps of the processor-executable business process and is selectable to execute the corresponding one of the plurality of actions.

7. A medium according to claim 6, the medium further comprising:
program code to automatically generate, based on the business process definition, a second user interface associated with a second one of the plurality of steps of the processor-executable business process embodied as code executable to present the second user interface, the second user interface comprising a second set of user interface controls, wherein each user interface control in the second set of user interface controls corresponds to one of a plurality of actions that are associated with the second one of the plurality of steps and is selectable to execute the corresponding one of the plurality of actions associated with the second one of the plurality of steps; and program code to automatically generate, based on the business process definition, a third user interface, the third user interface being embodied as code executable to present the third user interface comprising the first user interface and the second user interface.

8. A medium according to claim 7, the medium further comprising:
program code to present the first user interface and the second user interface in a same workspace.

9. A medium according to claim 6, the further comprising:
program code to transmit the automatically generated code to a client device.

10. A medium according to claim 6, wherein the first user interface comprises an area including at least one user interface element to execute the one of the plurality of actions.

11. A system comprising:
a computing device comprising:
a memory system storing processor-executable program code; and
a processor to execute the processor-executable program code in order to cause the computing device to:
retrieve a business process definition, the business process definition comprising a markup language file defining and including functionality related to a processor-executable business process that includes a plurality of steps, each of the plurality of steps of the processor-executable business process being associated with a plurality of actions; and
automatically generate, based on the business process definition, a first user interface associated with a first one of plurality of steps of the of the processor-executable business process, the first user interface being embodied as code executable to present a first user interface, the first user interface comprising a first set of user interface controls,
wherein each user interface control in the first set of user interface controls corresponds to one of a plurality of actions that are associated with the first one of the plurality of steps of the processor-executable business process and is selectable to execute the corresponding one of the plurality of actions.

12. A system according to claim 11, the processor to further execute the processor-executable program code in order to cause the computing device to:
automatically generate, based on the business process definition, a second user interface associated with a second one of the plurality of steps of the processor-executable business process, the second user interface being embodied as code executable to present the second user interface, the second user interface comprising a second set of user interface controls, wherein each user interface control in the second set of user interface controls corresponds to one of a plurality of actions that are associated with the second one of the plurality of steps and is selectable to execute the corresponding one of the plurality of actions associated with the second one of the plurality of steps; and automatically generate, based on the business process definition, a third user interface, the third user interface being embodied as code executable to present the third user interface comprising the first user interface and the second user interface.

13. A system according to claim 12, the processor to further execute the processor-executable program code in order to cause the computing device to:

present the first user interface and the second user interface in a same workspace.

14. A system according to claim 11, the processor to further execute the processor-executable program code in order to cause the computing device to:

transmit the automatically generated code to a client device.

15. A system according to claim 11, wherein the first user interface comprises an area including at least one user interface element to execute the one of the plurality of actions.

\* \* \* \* \*